(12) United States Patent
Takasaki et al.

(10) Patent No.: US 11,322,786 B2
(45) Date of Patent: May 3, 2022

(54) AIR ELECTRODE, METAL-AIR BATTERY, AND AIR ELECTRODE PRODUCTION METHOD (71) Applicant: SHARP KABUSHIKI KAISHA, Sakai (JP)

(72) Inventors: Mai Takasaki, Sakai (JP); Keigo Mitamura, Sakai (JP); Hiroyuki Yamaji, Sakai (JP); Fumitoshi Sugino, Sakai (JP); Hirotaka Mizuhata, Sakai (JP); Akihito Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/099,538

(22) Filed: Nov. 16, 2020

(65) Prior Publication Data
US 2021/0159561 A1    May 27, 2021

(30) Foreign Application Priority Data

Nov. 25, 2019 (JP) .............................. JP2019-212516

(51) Int. Cl.
H01M 12/06 (2006.01)
H01M 12/08 (2006.01)
H01M 4/88 (2006.01)
H01M 4/96 (2006.01)

(52) U.S. Cl.
CPC ......... *H01M 12/06* (2013.01); *H01M 4/8896* (2013.01); *H01M 4/96* (2013.01); *H01M 12/08* (2013.01)

(58) Field of Classification Search
None
See application file for complete search history.

(56) References Cited

U.S. PATENT DOCUMENTS

2015/0207191 A1* 7/2015 Kisdarjono ........... H01M 12/08
429/406

FOREIGN PATENT DOCUMENTS

JP 2002-110182 A 4/2002

OTHER PUBLICATIONS

JP2002110182A—machine translation (Year: 2002).*

* cited by examiner

Primary Examiner — Haroon S. Sheikh
(74) Attorney, Agent, or Firm — ScienBiziP, P.C.

(57) ABSTRACT

An air electrode includes a current collector, a catalyst layer, and a water repellent membrane provided in this order. The catalyst layer has a first face in contact with either one of the current collector and the water repellent membrane, a second face in contact with either other of the current collector or the water repellent membrane, and a plurality of through holes, through which the first face and the second face communicate with each other. The through holes each have a constriction with an inner diameter smaller than either of an opening diameter in the first face and an opening diameter in the second face.

11 Claims, 8 Drawing Sheets

AIR ELECTRODE, METAL-AIR BATTERY, AND AIR ELECTRODE PRODUCTION METHOD

BACKGROUND OF THE INVENTION

Field of the Invention

The present invention relates to an air electrode, a metal-air battery including an air electrode, and an air electrode production method.

Description of the Background Art

A metal-air battery uses atmospheric oxygen as a positive electrode active substance of the battery. In the structure of such metal-air battery, one face of an air electrode is in contact with an electrolytic solution and the other face is in contact with air. Generally, the air electrode is provided with air holes for the intake of air and has a porous structure inside. As an electrolytic solution, an alkaline aqueous solution for reducing the surface tension of water to enhance the osmosis is used, for instance.

Conventionally, there is a problem in that an electrolytic solution may permeate an air electrode and further leak out of the air electrode depending on the structure of the air electrode, the properties of the electrolytic solution, and the like. Leakage of an electrolytic solution causes a deterioration in battery performance that makes a long-lasting reliability and a long lifetime unobtainable, and also raises problems of safety, such as touching the electrolytic solution.

Figure 10:
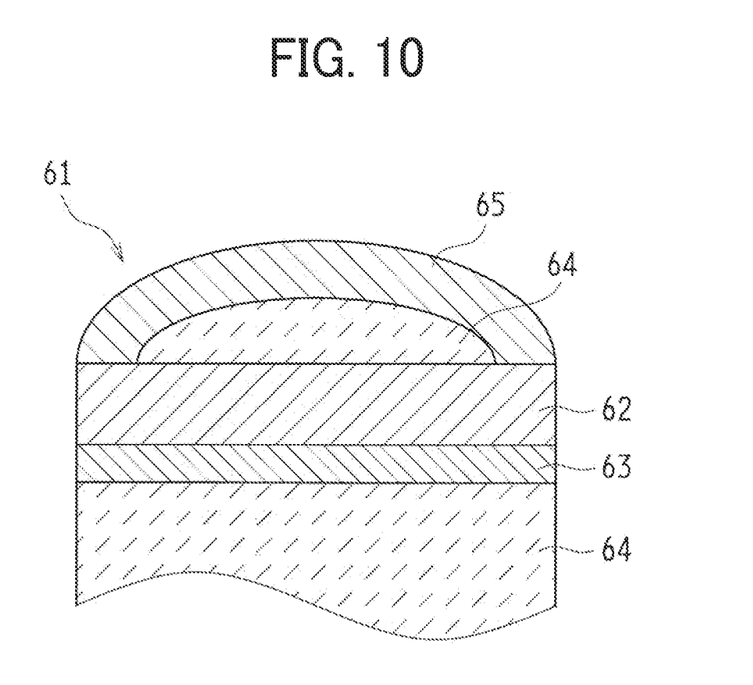
FIG. 10 is a cross-sectional view of a conventional air electrode.

In order to address such problems, it is thinkable that an air electrode 61 includes, apart from a catalyst layer 62 and a current collector 63, a water repellent membrane 65 provided outside the catalyst layer 62, as illustrated in FIG. 10. The water repellent membrane 65 makes it possible to briefly suppress the leakage of an electrolytic solution 64 indeed, but the electrolytic solution 64, which has permeated the catalyst layer 62, may be collected between the water repellent membrane 65 and the catalyst layer 62 to generate a gap at an interface between the water repellent membrane 65 and the catalyst layer 62 even if the measures as illustrated in FIG. 10 are taken. If such gap is generated, the electrolytic solution 64 collected between the catalyst layer 62 and the water repellent membrane 65 may reduce the amount of the air fed to the catalyst layer 62 to inhibit the electrode reaction of the catalyst layer 62.

JP 2002-110182 A, for instance, discloses an air electrode including a catalyst layer that is provided with a plurality of through holes formed by sticking a needle from one face to the other face of the catalyst layer. It is intended that the disclosed air electrode has a gas permeability enhanced by the through holes.

In JP 2002-110182 A, the gas permeability of the disclosed air electrode is taken into consideration, but no discussion is made about the possibility of leakage of an electrolytic solution through the through holes. As a consequence, the surface of the catalyst layer is covered with the electrolytic solution, so that the air required for the reaction is hardly fed to the catalyst layer and the reduction in battery lifetime is incurred. In addition, problems of safety are still remaining.

The present invention is made in view of the problems as above, and an object of the present invention is to prevent the detachment of a water repellent membrane and a catalyst layer from each other and the leakage of an electrolytic solution as well to enhance the battery performance, so as to provide an air electrode excellent in reliability and safety, a metal-air battery including such an air electrode, and a method of producing such an air electrode.

SUMMARY OF THE INVENTION

A means for solution according to an aspect of the present invention as a means for achieving the above object is an air electrode including a current collector, a water repellent membrane, and a catalyst layer arranged between the current collector and the water repellent membrane. The catalyst layer includes a first face in contact with either one of the current collector and the water repellent membrane, a second face in contact with either other of the current collector or the water repellent membrane, and a plurality of through holes, through which the first face and the second face communicate with each other. The plurality of through holes each have a constriction with an inner diameter smaller than either of an opening diameter in the first face and an opening diameter in the second face.

In the air electrode with the configuration as above, it is preferable that the plurality of through holes each have a cross section in a piercing direction that is a constricted shape having an inner diameter sequentially reduced from the first face toward inside of the catalyst layer and from the second face toward the inside of the catalyst layer.

A metal-air battery including the air electrode as above is also within the scope of technical ideas of the present invention. In other words, a metal-air battery according to another aspect of the present invention includes the air electrode with the configuration as above, a metal electrode, and an electrolyte.

Further, a method of producing the air electrode as above is also within the scope of technical ideas of the present invention. According to yet another aspect of the present invention, a method of producing an air electrode including a current collector, a water repellent membrane, and a catalyst layer arranged between the current collector and the water repellent membrane, the catalyst layer including a plurality of through holes each piercing to a first face and a second face of the catalyst layer, includes forming a plurality of first through holes in the catalyst layer before formation of the plurality of through holes, each first through hole piercing the catalyst layer in a thickness direction, and pressing the catalyst layer provided with the plurality of first through holes. The pressing is performed in a piercing direction of the plurality of first through holes to form, in the catalyst layer, through holes each having a constriction with an inner diameter smaller than either of an opening diameter in the first face and the opening diameter in the second face.

According to the present invention, the leakage of an electrolytic solution is successfully prevented and the battery performance is enhanced, which allows an air electrode excellent in reliability and safety and a metal-air battery including such an air electrode to be provided. In addition, an air electrode production method according to the present invention makes it possible to easily form an air electrode including a catalyst layer provided with through holes.

DESCRIPTION OF THE PREFERRED EMBODIMENTS

The following description is made on an air electrode, a metal-air battery, and an air electrode production method, all according to an embodiment of the present invention, with reference to the accompanying drawings.

Air Electrode

Figure 1:
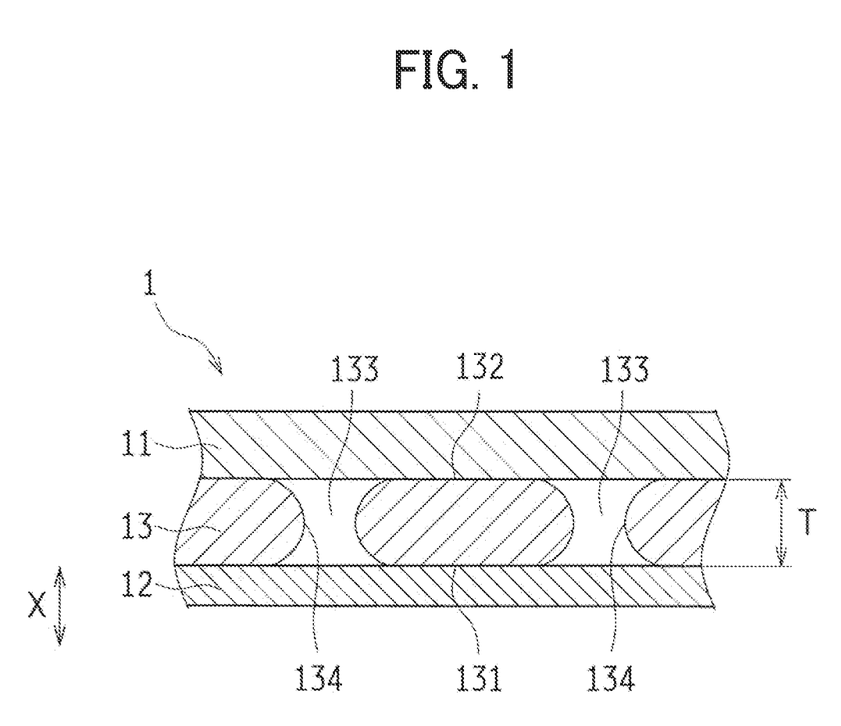
FIG. 1 is a partial cross-sectional view of an air electrode according an embodiment of the present invention.
Figure 2A:
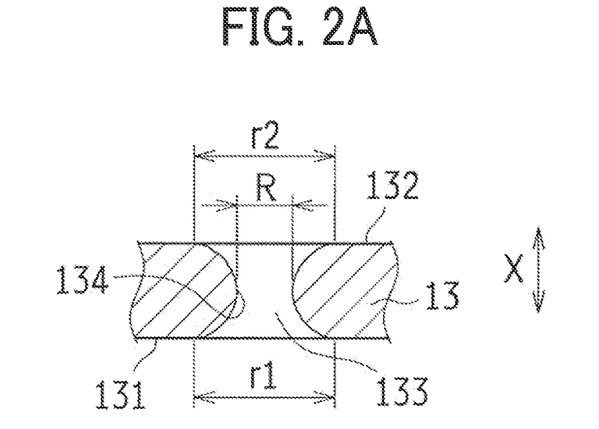
FIGS. 2A to 2C are partial cross-sectional views schematically illustrating a catalyst layer in the air electrode.
Figure 2B:
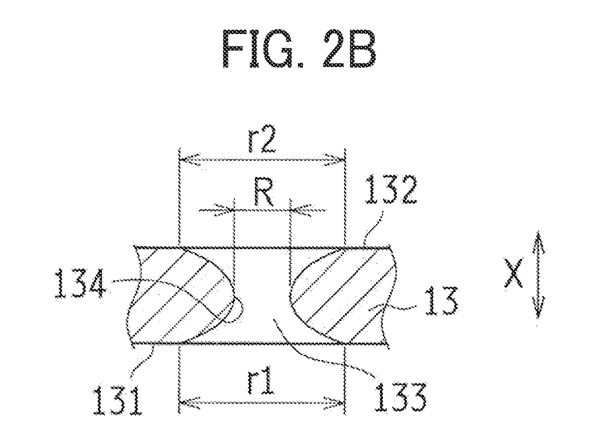
Figure 2C:
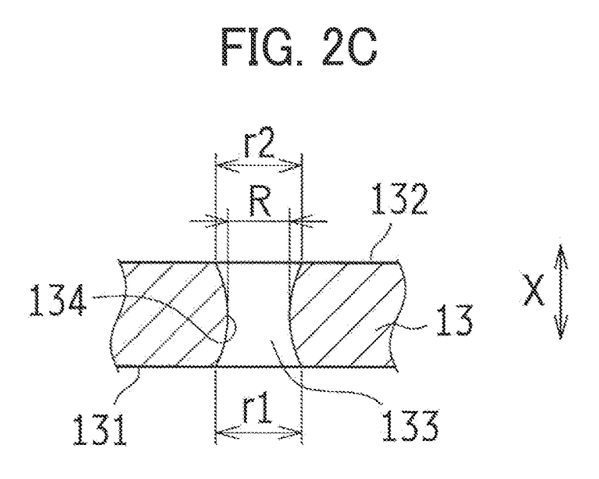

FIG. 1 is a partial cross-sectional view schematically illustrating an air electrode 1 according to the present embodiment, and FIGS. 2A to 2C are partial cross-sectional views of a catalyst layer 13 in the air electrode 1.

The air electrode 1 is an electrode that uses an oxygen gas as an electrode active substance and includes a catalyst for the electrode reaction (oxygen reduction reaction). As illustrated in FIG. 1, the air electrode 1 includes a water repellent membrane 11, a current collector 12, and the catalyst layer 13 arranged between the current collector 12 and the water repellent membrane 11.

The water repellent membrane 11 has holes allowing the passing through of air. Since the holes each have a water repellent inner wall, water hardly enters the holes, while air is capable of passing through the holes. The water repellent membrane 11 may be a porous layer allowing the passing through of air while preventing the passing through of water or may be so constructed as to include a porous fluororesin membrane, for instance.

The current collector 12 is an electric conductor serving as a conduction path that feeds electrons to the surface of a catalyst particle, on which the electrode reaction progresses. The current collector 12 may be a metal mesh or a porous metal plate, the material for which is metallic nickel, silver, gold, platinum or a stainless steel. The current collector 12 may also be a metal mesh or a porous metal plate subjected to nickel plating.

The current collector 12 can be made alkali-resistant to suppress the corrosion of the current collector 12 by an alkaline electrolytic solution. When the current collector 12 is a porous metal plate, examples of the preferred porous metal plate include an expanded metal, a punched metal, and a porous metal foil.

The catalyst layer 13 is a porous layer including catalyst particles, a conducting agent, and a binder. The electrode reaction of the air electrode 1 progresses on surfaces of the catalyst particles included in the catalyst layer 13. The catalyst particles have a catalytic activity on the oxygen reduction reaction. The material for the catalyst particles is a metal oxide or silver, for instance. The catalyst particles may be covered with the conducting agent adhered to the surfaces of the catalyst particles. The conducting agent may form a porous coating layer that covers the surface of a catalyst particle. Covering the catalyst particle surface with a porous coating layer formed of the conducting agent makes it possible to promptly feed electrons to the catalyst particle surface, on which the electrode reaction progresses.

The conducting agent electrically connects between the current collector 12 and the catalyst particle surface to feed electrons required for the electrode reaction to the catalyst particle surface. The conducting agent is carbon particles, for instance. Specifically, the conducting agent is preferably carbon particles, such as acetylene black, carbon black, carbon fibers, carbon nanotubes, activated charcoal, and graphite, and may be one type of such carbon particles or a mixture of two or more types of such carbon particles.

The binder is added in order to maintain the shape of the catalyst layer 13. The binder is, for instance, a fluororesin excellent in alkali resistance. A polytetrafluoroethylene (PTFE) that binds particles together while developing in a fiber form, has an excellent water repelling property, and is stable against heat can be used for the binder.

The air electrode 1 can be installed for use in a metal-air battery, for instance. In that case, the air electrode 1 is so arranged that the water repellent membrane 11 is on the air side. Such arrangement allows an electrolytic solution to soak into the catalyst layer 13 from the metal electrode side and makes it possible to feed air to the catalyst layer 13 through the water repellent membrane 11. As a result, a three-phase interface, at which the electrode reaction progresses, is formed in the catalyst layer 13.

As described before, the conventional air electrode has a problem in that a water repellent membrane and a catalyst layer are detached from each other to generate a gap at an interface between the water repellent membrane and the catalyst layer and an electrolytic solution is collected in the gap, which causes the reduction in amount of the air fed to the catalyst layer from the water repellent membrane side and the decrease in output of a metal-air battery.

In contrast, the catalyst layer 13, which is a component of the air electrode 1 according to the present embodiment, has a plurality of through holes 133 each opening in a first face 131 and a second face 132 of the catalyst layer 13, as illustrated in FIG. 1. Each through hole 133 has a constriction 134. As described later, the through holes 133 can each eventually serve as a passage for an electrolytic solution 53 to operate so that the electrolytic solution 53 may go back to the current collector 12 side (see FIG. 6). Thus, the collection of the electrolytic solution 53 between the catalyst layer 13 and the water repellent membrane 11 is prevented.

To be more specific: Each through hole 133 is so provided as to open in each of the first face 131 and the second face 132 of the catalyst layer 13 and pierce the catalyst layer 13 in a layer thickness direction X, as illustrated in FIG. 2A. The through hole 133 as illustrated has a cross section in the layer thickness direction X that is a constricted shape having an inner diameter sequentially reduced from the first face 131 toward the inside of the catalyst layer 13 and from the second face 132 toward the inside of the catalyst layer 13. The through hole 133 is formed so that an opening diameter (hole diameter) r1 of the through hole 133 in the first face 131 of the catalyst layer 13 and an opening diameter r2 of the through hole 133 in the second face 132 may each be larger than a constricted inner diameter R as a hole diameter at the constriction 134.

The constricted inner diameter R is an inner diameter of the narrowest portion of the through hole 133 and is, accordingly, smaller than either of the opening diameter r1 in the first face 131 and the opening diameter r2 in the second face 132. In the present embodiment as an example, it is preferable that the opening diameter r1 in the first face 131 and the opening diameter r2 in the second face 132 are each 1.1 to 4 times as large as the constricted inner diameter R.

The through hole 133 allows the electrolytic solution 53, which happens to reach the water repellent membrane 11 side, to go back to the current collector 12 side through the through hole 133. If, however, the opening diameters r1 and r2 fall below the magnitude 1.1 times as large as the constricted inner diameter R, the hydraulic pressure when the electrolytic solution 53 moves toward the catalyst layer 13 and passes through the through hole 133 is higher than the hydraulic pressure during the going back toward the current collector 12, so that it is impossible to prevent the collection of the electrolytic solution 53 between the catalyst layer 13 and the water repellent membrane 11. The through hole 133 having the constriction 134 reduces the hydraulic pressure and the amount of the electrolytic solution 53, which moves toward the catalyst layer 13, so that the electrolytic solution 53 having reached the catalyst layer 13 goes back toward the current collector 12 more easily and the collection of the electrolytic solution 53 between the catalyst layer 13 and the water repellent membrane 11 is suppressed. If the opening diameters r1 and r2 fall above the magnitude four times as large as the constricted inner diameter R, the through hole 133 is much narrowed, so that the electrolytic solution 53 having reached the water repellent membrane 11 side hardly goes back to the current collector 12 side and the collection of the electrolytic solution 53 between the catalyst layer 13 and the water repellent membrane 11 is liable to occur.

As an example, in the catalyst layer 13 as illustrated in FIG. 2A, the opening diameter r1 of the through hole 133 in the first face 131 and the opening diameter r2 in the second face 132 are each two times as large as the constricted inner diameter R at the constriction 134. In the catalyst layer 13 illustrated in FIG. 2B, the through hole 133 is formed so that the opening diameter r1 in the first face 131 and the opening diameter r2 in the second face 132 may each be three times as large as the constricted inner diameter R. In the catalyst layer 13 illustrated in FIG. 2C, the through hole 133 is formed so that the opening diameter r1 in the first face 131 and the opening diameter r2 in the second face 132 may each be 1.3 times as large as the constricted inner diameter R.

As illustrated in FIG. 2A, a cross section (cross section in the layer thickness direction X) of the through hole 133 in a plane orthogonal to the first face 131 and the second face 132 is of a shape most constricted in a nearly mid portion in the layer thickness direction X of the catalyst layer 13. The constriction 134 is formed with an inner wall in the form of a curved face that gently expands.

The constriction 134 is not necessarily formed in a nearly mid portion in the layer thickness direction X of the catalyst layer 13 but may be formed closer to the first face 131 or the second face 132 in the layer thickness direction X than in FIG. 2A. In addition, the opening diameter r1 in the first face 131 and the opening diameter r2 in the second face 132 are not necessarily the same but may be different as long as each is 1.1 to 4 times as large as the constricted inner diameter R. A specific size of the through hole 133 is preferably such that the constricted inner diameter R at the constriction 134 is 100 to 400 μm. If the constricted inner diameter R is less than 100 μm, the electrolytic solution 53 having reached the water repellent membrane 11 side hardly goes back to the current collector 12 side and the collection of the electrolytic solution 53 between the catalyst layer 13 and the water repellent membrane 11 is liable to occur. If the constricted inner diameter R is more than 400 μm, the reaction area of the catalyst layer 13 is reduced, leading to the deterioration in voltage characteristics.

In the first face 131 or the second face 132 of the catalyst layer 13, the number per unit area of the through holes 133 is preferably 2 to 40/cm$^2$. The through holes 133 formed in such number may be arranged to disperse in the catalyst layer 13 uniformly or at different densities. It is particularly preferable that the through holes 133 are provided more thickly in a lower portion of the catalyst layer 13 than in an upper portion in a vertical direction Y orthogonal to the piercing direction of the through holes 133 (the layer thickness direction X of the catalyst layer 13).

A composite obtained by the pressure bonding of the catalyst layer 13 provided with the through holes 133 and the current collector 12 preferably has an air permeance of 1.0 sec/100 cc to 100 sec/100 cc. The air permeance of the water repellent membrane 11, which is provided on the pressure bonding composite as above, is preferably 10 sec/100 cc to 10,000 sec/100 cc. The air permeance is measured on the basis of Japanese Industrial Standards (JIS) P8117 (Gurley method).

Metal-Air Battery

Figure 3:
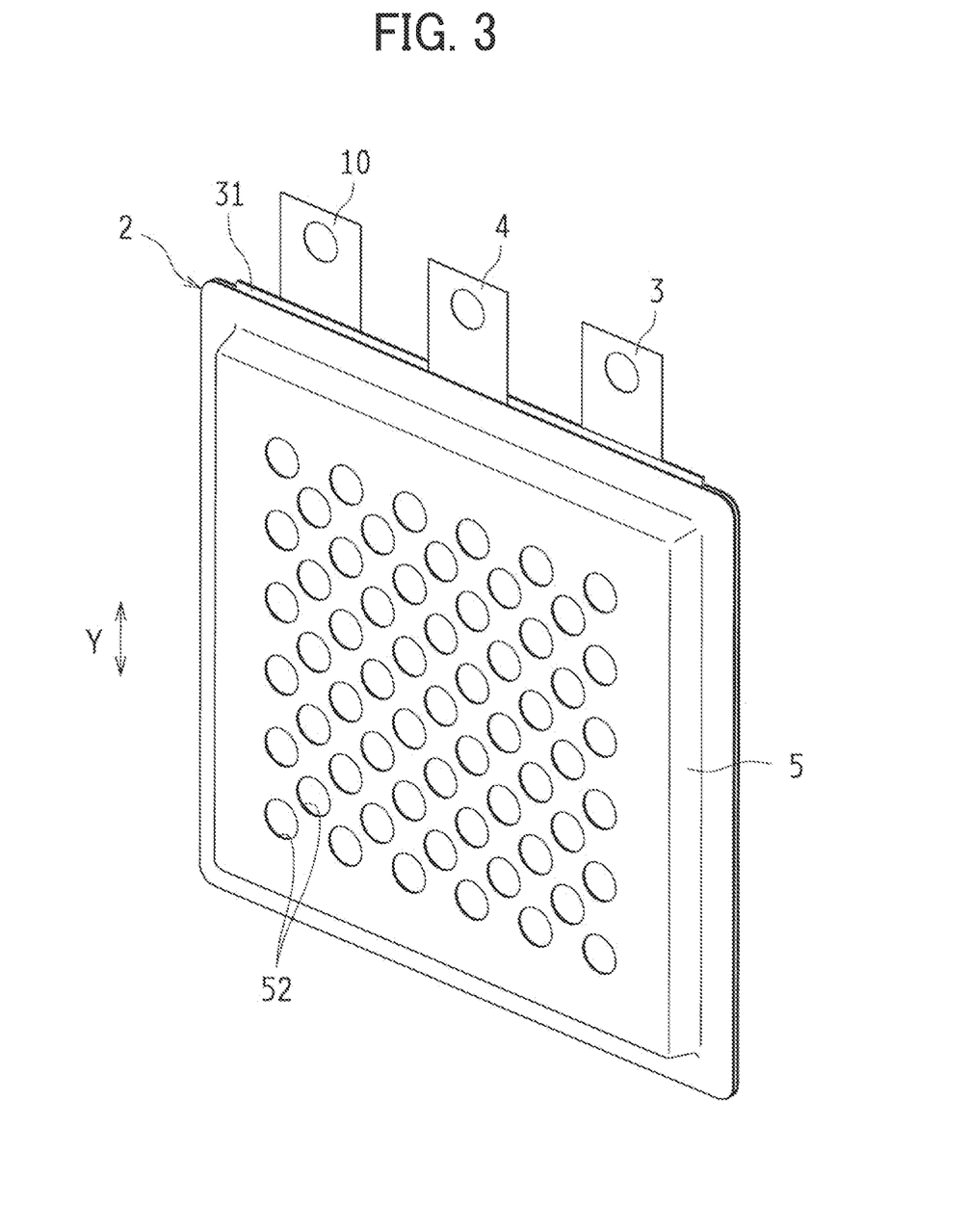
FIG. 3 is a perspective view illustrating an example of a metal-air battery according to an embodiment of the present invention.

The air electrode 1, which has the configuration as described above, can be applied to a metal-air battery 2, for instance. FIG. 3 is a perspective view of an example of the metal-air battery 2, and FIG. 4 is an exploded diagram illustrating components of the metal-air battery 2.

The metal-air battery 2 includes a metal negative electrode (metal electrode) 3 that includes metal serving as an electrode active substance, a charging positive electrode 4 that is used as a positive electrode during the charging, and a discharging positive electrode 10 that is used as a positive electrode during the discharging, all arranged in a battery case 5. The air electrode 1 can be used as the discharging positive electrode 10 of the metal-air battery 2.

In the present embodiment as an example, the metal-air battery 2 is a secondary battery of a three-electrode type that has the metal negative electrode 3, the discharging positive electrode 10, and the charging positive electrode 4 arranged parallel to one another while immersed in an electrolytic solution in the battery case 5. In the description below, the upward direction in FIG. 3 is assumed to be the upward direction in the metal-air battery 2.

Figure 4:
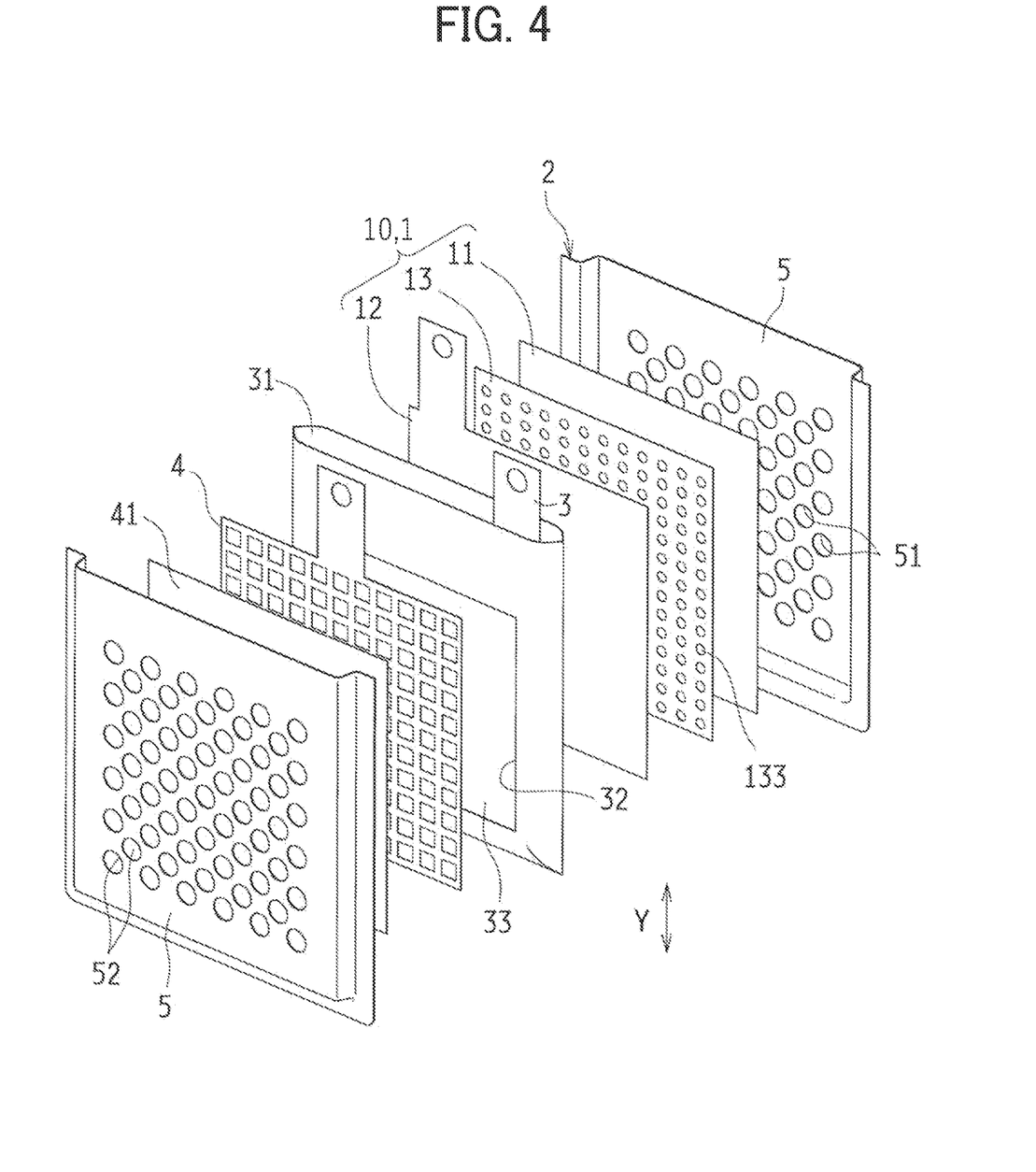
FIG. 4 is an exploded diagram illustrating a configuration of the metal-air battery.

As illustrated in FIG. 4, the discharging positive electrode 10, a negative electrode case 31 housing the metal negative electrode 3, and the charging positive electrode 4 are sequentially arranged in the battery case 5 of the metal-air battery 2. The metal-air battery 2 includes a layer of an electrolytic solution (not illustrated) between the individual electrodes.

The charging positive electrode 4 is a porous electrode serving as a positive electrode during the charging. If an alkaline aqueous solution is used as an electrolytic solution, a reaction (charging reaction), in which oxygen, water, and electrons are generated from hydroxide ions (OH$^-$), occurs in the charging positive electrode 4. In other words, in the charging positive electrode 4, the charging reaction progresses at a three-phase interface where oxygen (gas phase), water (liquid phase), and an electron conductor (solid phase) coexist.

The charging positive electrode 4 is so provided as to allow the diffusion of an oxygen gas and other gases generated by the progress of the charging reaction. For instance, the charging positive electrode 4 is provided so that at least part of the charging positive electrode 4 may be connected with the outside air. In the present embodiment as an example, a plurality of gas outlets 52 are provided on the battery case 5, and the oxygen gas and other gases generated by the charging reaction are exhausted from the charging positive electrode 4 through the gas outlets 52.

Desirably, the charging positive electrode 4 is porous and is made of a material having the electron conductivity. If an alkaline aqueous solution is used as an electrolytic solution, it is desirable in terms of the corrosion resistance and an oxygen generating catalytic activity on the charging reaction to use nickel or a metallic material such as a stainless steel, whose surface is subjected to nickel plating. The charging positive electrode 4 may be made porous by using a mesh, an expanded metal, a punched metal, a sinter of metal particles or metal fibers, a metal foam or the like for the charging positive electrode 4.

The charging positive electrode 4 is provided with a water repellent membrane 41 similar in configuration to the water repellent membrane 11 of the discharging positive electrode 10 (the air electrode 1). The water repellent membrane 41 is arranged on the side opposite to the side where the metal negative electrode 3 is arranged (that is to say, arranged on the battery case 5 side). The water repellent membrane 41 suppresses the leakage of the electrolytic solution through the charging positive electrode 4 and allows the oxygen gas and other gases generated by the charging reaction to be separated from the electrolytic solution and exhausted outside the battery case 5. The charging positive electrode 4 is electrically connectable with a charging positive electrode terminal, which makes it possible to feed an electric charge required for the charging reaction from an external circuit (not illustrated).

The discharging positive electrode 10 serves as a positive electrode during the discharge of the metal-air battery 2. To the discharging positive electrode 10, the air electrode 1, which includes the catalyst layer 13 provided with the through holes 133, is applied. If an alkaline aqueous solution is used as an electrolytic solution, a discharging reaction, in which water fed from the electrolytic solution reacts with an oxygen gas and electrons fed from the air to generate hydroxide ions (OH$^-$), occurs in the catalyst layer 13. Thus in the discharging positive electrode 10, the discharging reaction progresses at a three-phase interface where oxygen (gas phase), water (liquid phase), and an electron conductor (solid phase) coexist.

The battery case 5 is provided with a plurality of air inlets 51. The oxygen gas contained in the air is diffused into the discharging positive electrode 10 through the air inlets 51. The water repellent membrane 11 in the discharging positive electrode 10 is arranged on the battery case 5 side. The discharging positive electrode 10 is electrically connectable with a discharging positive electrode terminal (air electrode terminal), which makes it possible to take out an electric charge generated in the catalyst layer 13 to an external circuit (not illustrated).

The metal negative electrode 3 is an electrode made of an active substance containing a metallic element (negative electrode active substance), in which an oxidation reaction of the active substance occurs during the discharging and a reduction reaction during the charging. Examples of the metallic element to be used include zinc, lithium, sodium, calcium, magnesium, aluminum, and iron.

In the present embodiment as an example, the metal negative electrode 3 is housed in the negative electrode case 31 and as such provided in the battery case 5. In the negative electrode case 31, a separator 33 formed of an electronically insulating material is also housed to block an opening 32 of the negative electrode case 31. The separator 33 is so provided as to intervene between the metal negative electrode 3 and the charging positive electrode 4 and between the charging positive electrode 4 and the discharging positive electrode 10, so as to suppress the short circuit due to a metal dendrite reduction-deposited to the metal negative electrode 3 during the charging. The negative electrode case 31 is sealed at the top by heat fusion after the electrolytic solution is injected.

If the metallic element in the metal negative electrode 3 is zinc, an oxidation reaction of zinc metal occurs during the discharging. In other words, as a result of the oxidation, zinc may be dissolved in the electrolytic solution as zincate ions, or zinc oxide or zinc hydroxide may directly be produced. During the charging, a reduction reaction to zinc metal occurs. In other words, zinc may be produced by the reduction of zincate ions dissolved in the electrolytic solution, or zinc oxide or zinc hydroxide may directly be reduced to zinc.

The metal negative electrode 3, the discharging positive electrode 10, and the charging positive electrode 4 in the battery case 5 are immersed in the electrolytic solution. The electrolytic solution is, for instance, an ion conductive liquid with an electrolyte dissolved in a solvent. The electrolytic solution varies in type according to the type of the electrode active substance contained in a metal electrode, while an electrolytic solution using water as a solvent (aqueous electrolyte solution) is preferred.

If a zinc-air battery, an aluminum-air battery, an iron-air battery or the like is applied as the metal-air battery 2, an alkaline aqueous solution such as an aqueous sodium hydroxide solution or an aqueous potassium hydroxide solution may be used as an electrolytic solution. In the case of a magnesium-air battery, an aqueous sodium chloride solution may be used as an electrolytic solution and, in the case of a lithium-air battery, an organic electrolytic solution may be used. The electrolytic solution may contain an organic additive or an inorganic additive other than the electrolyte. The electrolytic solution may also be a gel electrolyte or a polymer electrolyte obtained by gelation with a polymer additive.

In the discharging positive electrode 10, the water repellent membrane 11, the catalyst layer 13, and the current collector 12 are stacked in this order from the battery case 5 side, as illustrated in FIG. 4. As described before, the through holes 133 each having the constriction 134 are present in the catalyst layer 13. Therefore, even the electrolytic solution, which happened to move from the interior of the metal-air battery 2 into a space between the water repellent membrane 11 and the catalyst layer 13, goes back to the current collector 12 side through the through holes 133 and remains in the interior of the metal-air battery 2. The electrolytic solution is thus prevented from being collected between the water repellent membrane 11 and the catalyst layer 13 and from leaking out of the catalyst layer 13 as well, which reduces the possibility that a user touches the leaking electrolytic solution, to thereby improve the safety.

Figure 5A:
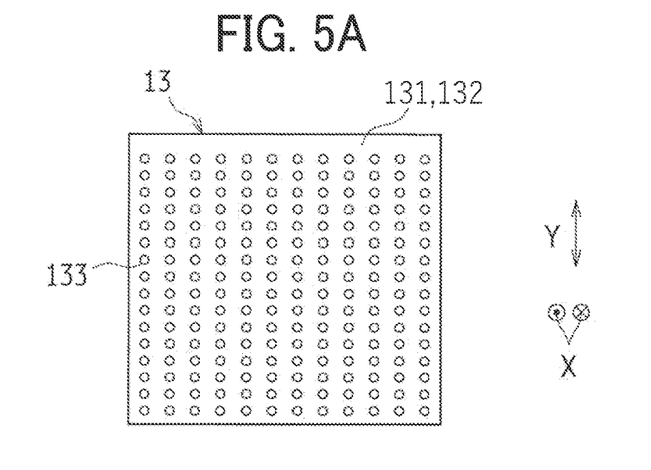
FIGS. 5A to 5C are diagrams illustrating examples of the catalyst layer in the air electrode.
Figure 5B:
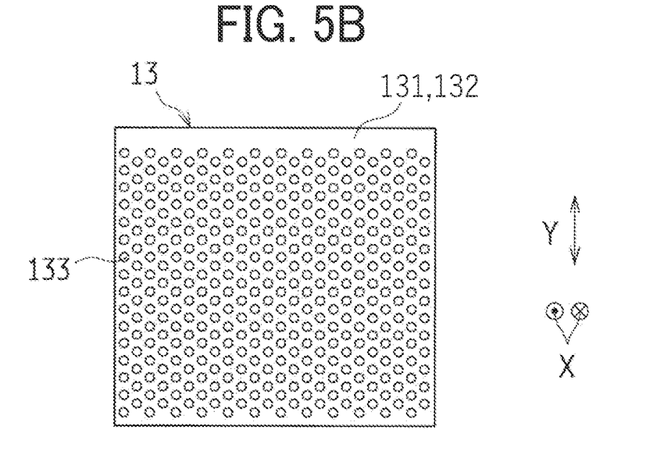

The through holes 133 provided in the catalyst layer 13 of the discharging positive electrode 10 (the air electrode 1) can variously be arranged. The through holes 133 may be arranged to uniformly disperse in the catalyst layer 13 as illustrated in FIG. 5A or, as illustrated in FIG. 5B, to disperse more thickly than in the catalyst layer 13 in FIG. 5A. As described before, the number per unit area of the through holes 133 in the catalyst layer 13 is preferably 2 to 40/cm$^2$.

Figure 5C:
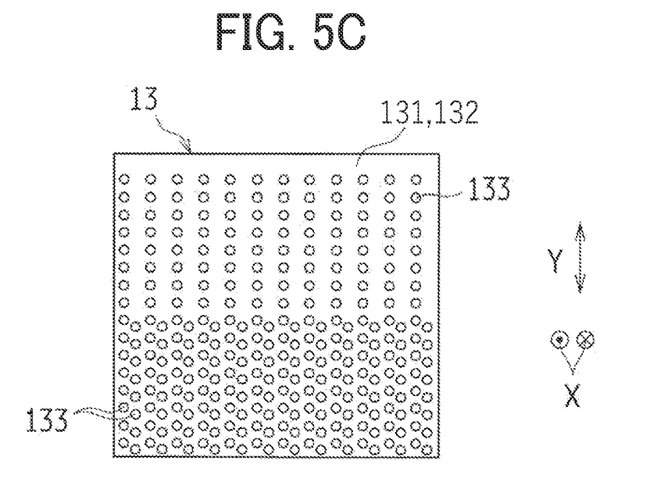

The through holes 133 may also be arranged more thickly in a lower portion of the catalyst layer 13 than in an upper portion in the vertical direction Y orthogonal to the piercing direction of the through holes 133 (the layer thickness direction X of the catalyst layer 13) as illustrated in FIG. 5C. In the battery case 5 of the metal-air battery 2, the electrolytic solution is liable to be collected below under the effects of gravity and the water repellent membrane 11 tends to be easy to detach. In contrast, the leakage of the electrolytic solution can be much more suppressed by arranging the through holes 133 more thickly in a lower portion of the catalyst layer 13 of the discharging positive electrode 10 than in an upper portion of the catalyst layer 13.

Figure 6:
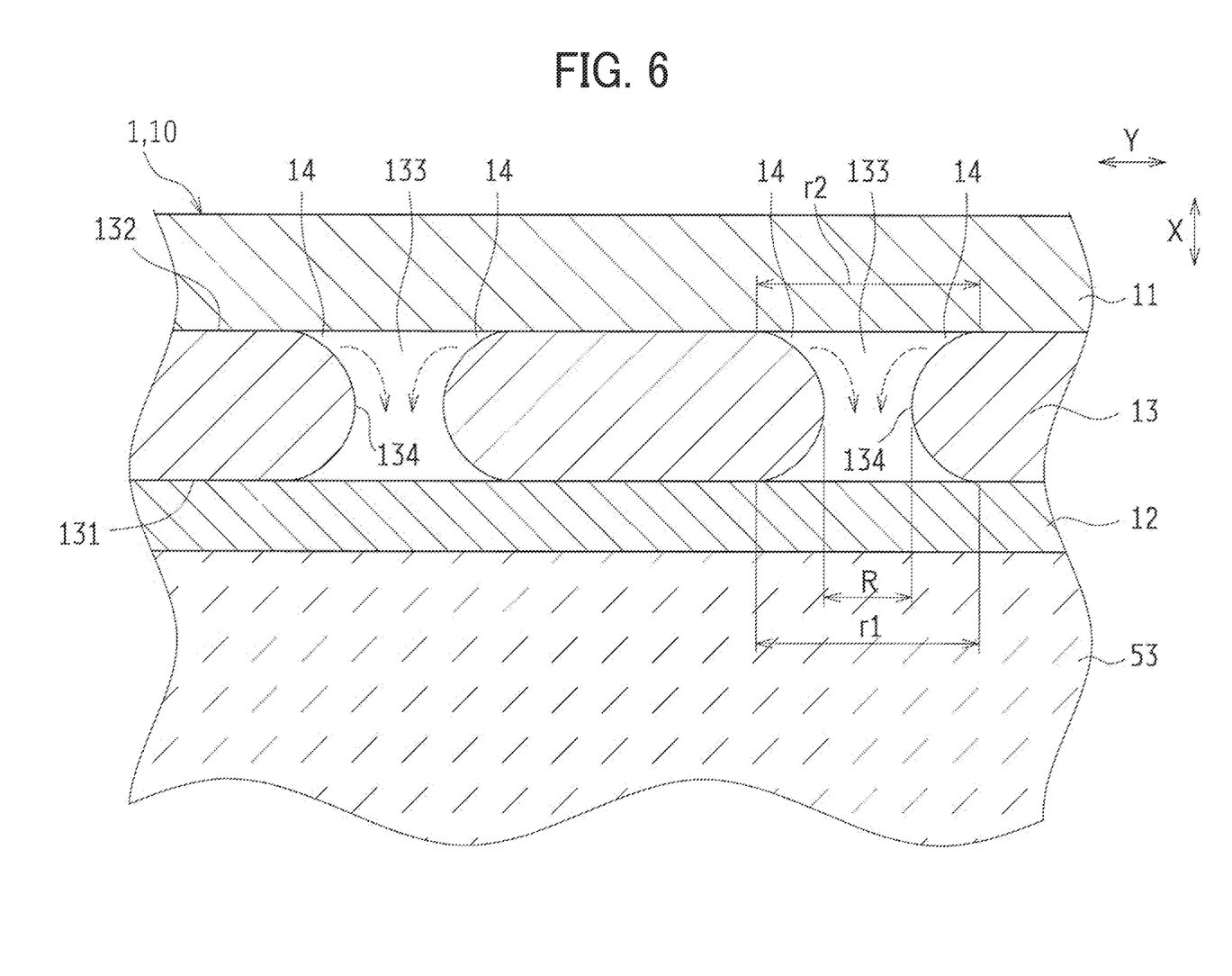
FIG. 6 is a diagram illustrating an air electrode in the metal-air battery.

FIG. 6 is a diagram illustrating the operation of the through holes 133 of the air electrode 1 in the metal-air battery 2. The effects as described below are achieved by providing the catalyst layer 13 with the through holes 133 each having the constriction 134.

In the oxygen reduction reaction, which occurs in the catalyst layer 13, hydroxide ions are produced. Generally, hydroxide ions are diffused in a catalyst layer toward an electrolytic solution layer (region where a bulk of electrolytic solution in contact with the catalyst layer exists) side. In fact, since the distance from the catalyst layer to the electrolytic solution layer is relatively long, the hydrogen ion concentration index (pH) of the electrolytic solution in the catalyst layer is to be increased. In that case, an osmotic pressure allowing the electrolytic solution to permeate the catalyst layer is generated for the reduction of pH increase and the permeation of the electrolytic solution into the catalyst layer is accelerated. As a result, a problem rises in that the electrolytic solution is liable to be collected at the interface between the catalyst layer and a water repellent membrane.

In contrast to the above general case, in the air electrode 1 (the discharging positive electrode 10) according to the present embodiment, the through holes 133 of the catalyst layer 13 each have the constriction 134. As illustrated in FIG. 6, the inner wall of each through hole 133 is so shaped as to gradually spread toward the water repellent membrane 11 at a portion closer to the second face 132 of the catalyst layer 13, so that a void 14 is formed between the water repellent membrane 11 and the catalyst layer 13 in a region of such spread. To be more specific, the space (the void 14), which is enclosed by an inner face of the water repellent membrane 11 that is in contact with the second face 132 and the inner wall of the through hole 133, and is gradually narrowed, is so formed as to reach an interface where the catalyst layer 13 and the water repellent membrane 11 are in close contact with each other. The electrolytic solution 53, which has passed through the catalyst layer 13, is guided to the void 14 between the water repellent membrane 11 and the catalyst layer 13 before accumulating at the interface where the catalyst layer 13 and the water repellent membrane 11 are in close contact with each other, and further guided into the through hole 133. Consequently, the electrolytic solution 53 is delivered to the first face 131 side (the current collector 12 side) without being collected at the interface between the water repellent membrane 11 and the catalyst layer 13. In addition, the shape of the through hole 133 that spreads toward the water repellent membrane 11 side makes the intake of the outside air easier and, as a result, increases the reaction area, which improves the voltage characteristics.

On the other hand, the area of a contact interface between the electrolytic solution 53 and the catalyst layer 13 is increased by shaping the inner wall of each through hole 133 so that the inner wall may gradually spread toward the electrolytic solution 53 side (the current collector 12 side) at a portion closer to the first face 131 of the catalyst layer 13. If the area of the contact interface is increased, the hydroxide ions as produced in the oxygen reduction reaction are promptly diffused into the electrolytic solution 53, leading to the reduction in pH increase of the electrolytic solution 53 in the catalyst layer 13. As a result, the electrolytic solution 53 is prevented from being collected at the interface between the water repellent membrane 11 and the catalyst layer 13. Further advantages of such shaping are as follows: The improvement in initial osmosis of the electrolytic solution results in an easier progress of the battery reaction, which makes it possible to improve initial voltage characteristics. The reduction in zincate ion mobility on the path from the electrolytic solution to the air electrode makes it possible to improve the battery lifetime. In addition, the through hole 133 having the constriction 134 provides a narrowed path for liquid flowing from the first face 131 side to the second face 132 side, which makes it possible to suppress the flow toward the water repellent membrane 11.

As described above, the through holes 133 are each of a constricted shape that spreads toward the water repellent membrane 11 side and toward the current collector 12 side. Consequently, each through hole 133 has both of the effect on the water repellent membrane 11 side of the constriction 134 and the effect on the current collector 12 side of the constriction 134 and operates such that the collection of the electrolytic solution 53 between the water repellent membrane 11 and the catalyst layer 13 is effectively prevented. The constriction 134 makes the air easier to retain in the through hole 133 and, accordingly, improves the reaction efficiency of the catalyst layer 13.

Thus in the air electrode 1, the detachment of the water repellent membrane 11 and the catalyst layer 13 from each other is prevented, no gap is generated at the interface between the water repellent membrane 11 and the catalyst layer 13, and the air reaches the catalyst layer 13 through the water repellent membrane 11. The electrode reaction smoothly progresses in the catalyst layer 13, and the leakage of the electrolytic solution 53 is suppressed over a long period of time. As a result, in the metal-air battery 2, which includes the air electrode 1, the decrease in output is suppressed and the battery lifetime is improved.

In the present embodiment as an example, the air electrode 1 is used as the discharging positive electrode 10 in the metal-air battery 2, to which the present invention is not limited. The air electrode 1 may be used for a fuel battery. In the air electrode 1, the catalyst layer 13 may have any configuration as long as each through hole 133 has the constriction 134 with the inner diameter (the constricted inner diameter R), which is smaller than either of the opening diameter r1 in the first face 131 and the opening diameter r2 in the second face 132, and one of the first face 131 and the second face 132 is in contact with the current collector 12 and the other in contact with the water repellent membrane 11. Therefore, the catalyst layer 13 has a reversible configuration allowing the catalyst layer 13 to be used without distinguishing the first face 131 and the second face 132 from each other and is easy to handle in the production process of the air electrode 1, which improves the productivity.

Air Electrode Production Method

Figure 7:
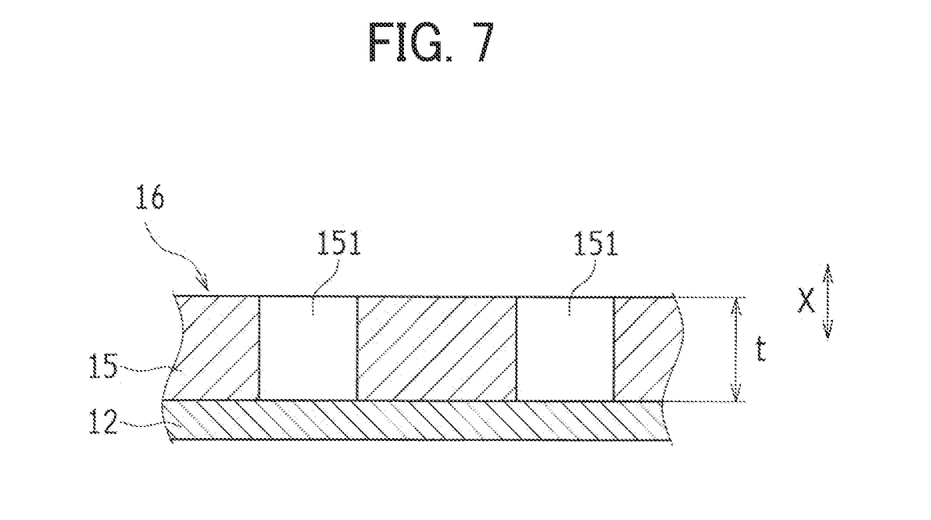
FIG. 7 is a diagram illustrating one process of a method of producing the air electrode.
Figure 8:
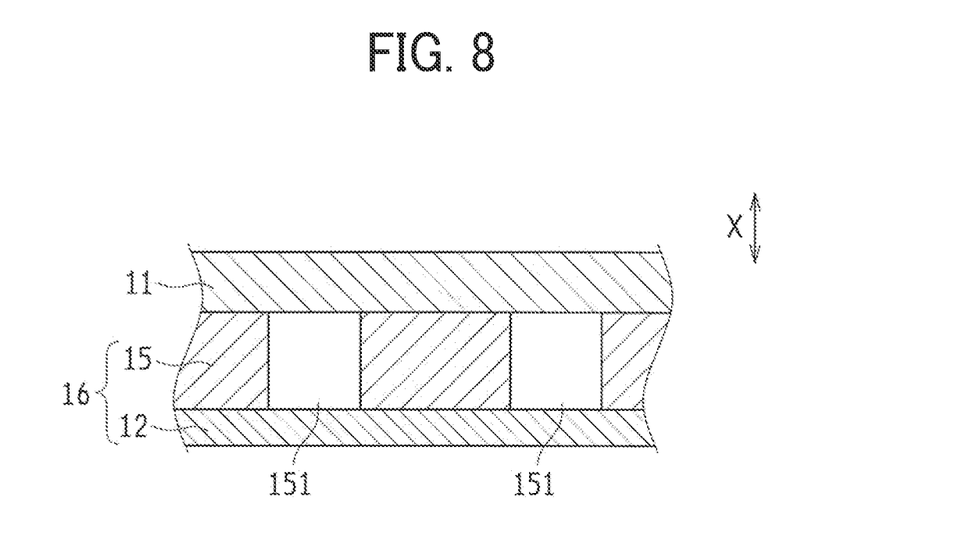
FIG. 8 is a diagram illustrating a process subsequent to the process in FIG. 7.
Figure 9:
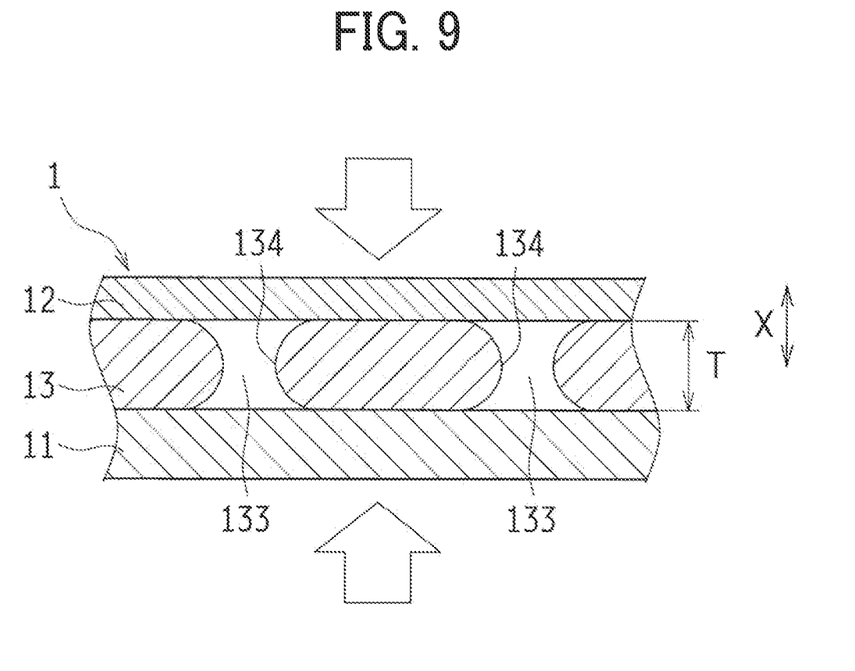
FIG. 9 is a diagram illustrating a process subsequent to the process in FIG. 8.

In the following, a method of producing the air electrode 1 with the configuration as above is described. FIGS. 7 to 9 are partial cross-sectional views schematically illustrating a production method for the air electrode 1. FIG. 7 illustrates one process of the production method, FIG. 8 a process subsequent to the process in FIG. 7, and FIG. 9 illustrates a process subsequent to the process in FIG. 8.

In the illustrated production method for the air electrode 1, a catalyst paste containing catalyst particles, a conducting agent, and a binder is kneaded and formed into a sheet so as to obtain a mixture sheet 15 for a catalyst layer. Next, the mixture sheet 15 for a catalyst layer is superposed on the current collector 12, then the current collector 12 and the mixture sheet 15 are combined together on a rolling machine to form a composite 16 of the current collector 12 and the mixture sheet 15 for a catalyst layer in advance. If the current collector 12 is made of a metal mesh or a porous metal plate, thermal damage is suppressed during the formation of the composite 16.

Subsequently, as illustrated in FIG. 7, a plurality of first through holes 151 each piercing the mixture sheet 15 in a thickness direction of the mixture sheet 15 are formed from the mixture sheet 15 side of the composite 16 (hole forming process). The first through holes 151 are each a hole that has an almost cylindrical inner face and, accordingly, does not have the constriction 134 yet.

In the hole forming process, a plurality of acicular bodies each reaching the inside of the mixture sheet 15 from above are so set as to face the composite 16, which is placed with the current collector 12 being directed below, and brought into pressure contact with the composite 16, then drawn out of the mixture sheet 15 to form the first through holes 151. A thickness t of the mixture sheet 15 in the composite 16 is larger than a final thickness T (see FIG. 1) of the catalyst layer 13. The number of and the distance between the acicular bodies to be set are determined at will according to the air permeance and the like whose achievement is required of the through holes 133 provided in the catalyst layer 13.

Next, as illustrated in FIG. 8, the water repellent membrane 11 is superposed on the composite 16 to sandwich the mixture sheet 15 between the water repellent membrane 11 and the current collector 12. Then, the assembly as obtained is reversed so that the composite 16 may be located on the water repellent membrane 11.

Next, as illustrated in FIG. 9, a pressure is applied to the water repellent membrane 11 and the composite 16 as reversed, so that the water repellent membrane 11 is pressure-bonded to and integrated with the composite 16 (pressing process). Thus obtained is the air electrode 1, in which the water repellent membrane 11, the catalyst layer 13, and the current collector 12 are integrally joined together. In the pressing process, the mixture sheet 15 in the composite 16 is contracted by pressing to the thickness T and, at the same time, each first through hole 151 is so constricted as to have an inner wall expanding inward, and changed into the through hole 133 having the constriction 134.

As a consequence, the air electrode 1 as illustrated in FIG. 1, which includes the catalyst layer 13 provided with the through holes 133 each having the constriction 134, is formed. In the air electrode 1, the water repellent membrane 11, the catalyst layer 13, and the current collector 12 are sequentially stacked, and the catalyst layer 13 is provided with the through holes 133 each piercing the catalyst layer 13 in the layer thickness direction X.

In the production method for the air electrode 1 as described above, the composite 16 is initially formed, then the first through holes 151 are formed in the hole forming process and the pressing process is subsequently performed, to which the present invention is not limited. A method may be employed, in which the first through holes 151 are previously formed by pressing in the layer thickness direction X to obtain the catalyst layer 13 provided with the through holes 133, and the catalyst layer 13 thus obtained is sandwiched between the current collector 12 and the water repellent membrane 11 so as to integrate the catalyst layer 13, the current collector 12, and the water repellent membrane 11 together while forming the constriction 134 of each through hole 133.

In the air electrode 1, which is produced as described above, the through holes 133 prevent the detachment of the water repellent membrane 11 and the catalyst layer 13 from each other and the generation of a gap at the interface between the water repellent membrane 11 and the catalyst layer 13, and the air is allowed to reach the catalyst layer 13 through the water repellent membrane 11. The electrode reaction smoothly progresses in the catalyst layer 13, which makes it possible to suppress the leakage of the electrolytic solution 53 over a long period of time. As a result, the decrease in output of the metal-air battery 2, which includes the air electrode 1, is suppressed, which makes it possible to improve the battery lifetime.

It should be noted that any of the air electrode 1, the metal-air battery 2, and the production method for the air electrode 1 as described above is not limited to the configuration illustrated in the above embodiment but can be embodied according to various configurations. The technical scope of the present invention is not interpreted solely in accordance with the above embodiment, and is based on the claims. In addition, the technical scope of the present invention encompasses all modifications equivalent in sense and definition to the claims.

EXAMPLES

The air electrode 1 and the metal-air battery 2 including the air electrode 1, both according to the above embodiment of the present invention, are described in more detail with reference to the Examples below.

In Examples 1 through 4, the configuration of through holes in a catalyst layer as a component of an air electrode was varied. The catalyst layer was so fabricated as to have an air permeance of 1200 sec/100 cc as a mixture sheet before the formation of the through holes. A pressing machine was used to hold the mixture sheet and a current collector at a pressure of 65 kN for two minutes to pressure-bond the mixture sheet and the current collector together so as to obtain a composite with a size of 5.3 cm×5.3 cm.

As a hole forming process, a frog with a large number of acicular bodies was brought into pressure contact with the obtained composite at 2 kN and held as such for five seconds to form first through holes. Then as a pressing process, a water repellent membrane was added to the composite, and the water repellent membrane and the composite were held at a pressure of 65 kN for two minutes to pressure-bond the water repellent membrane and the composite together and impart a constriction to each through hole in the catalyst layer. While the thickness of the mixture sheet was 0.49 mm, the thickness of the catalyst layer was 0.29 mm.

Example 1

The composite having been provided as described above was subjected to the hole forming process and the pressing process so as to form 60 through holes each having an opening diameter of 500 μm in a first face and a second face of the catalyst layer in a region that was a fourth of the first face (or the second face) and thereby obtain an air electrode of Example 1. The number per unit area of the through holes of the air electrode was 2.1/cm², which allowed the composite to have an air permeance of 92.5 sec/100 cc having fallen within a preferable range of 1.0 to 100 sec/100 cc.

Example 2

The composite having been provided as described above was subjected to the hole forming process and the pressing process so as to form 240 through holes that uniformly dispersed over the entire first face (or the entire second face) and each had an opening diameter of 500 μm in the first face and the second face, and thereby obtain an air electrode of Example 2. The number per unit area of the through holes of the air electrode was 8.5/cm², which allowed the composite to have an air permeance of 20.1 sec/100 cc having fallen within the preferable range of 1.0 to 100 sec/100 cc.

Example 3

The composite having been provided as described above was subjected to the hole forming process and the pressing process so as to form 480 through holes that uniformly dispersed over the entire first face (or the entire second face) and each had an opening diameter of 500 μm in the first face and the second face, and thereby obtain an air electrode of Example 3. The number of the through holes was two times as large as the number of the through holes in Example 2. The number per unit area of the through holes of the air electrode was 17.1/cm², which allowed the composite to have an air permeance of 1.5 sec/100 cc having fallen within the preferable range of 1.0 to 100 sec/100 cc.

Example 4

The composite having been provided as described above was subjected to the hole forming process and the pressing process so as to form 960 through holes that uniformly dispersed over the entire first face (or the entire second face) and each had an opening diameter of 500 μm in the first face and the second face, and thereby obtain an air electrode of Example 4. The number of the through holes was four times as large as the number of the through holes in Example 2. The number per unit area of the through holes of the air electrode was 34.2/cm², which allowed the composite to have an air permeance of 1.0 sec/100 cc having fallen within the preferable range of 1.0 to 100 sec/100 cc.

Comparative Example 1

As Comparative Example 1, an air electrode was produced without performing the formation of through holes on the composite. The air permeance of the composite in Comparative Example 1 was 1200 sec/100 cc.

Comparative Example 2

The composite having been provided as described above was subjected to the hole forming process and the pressing process so as to form 1200 through holes that uniformly dispersed over the entire first face (or the entire second face) and each had an opening diameter of 500 μm in the first face and the second face, and thereby obtain an air electrode. The number of the through holes was five times as large as the number of the through holes in Example 2. The number per unit area of the through holes of the air electrode was 42.7/cm², which made the composite have an air permeance of 0.8 sec/100 cc.

TABLE 1

| | Air permeance [sec/100 cc, air] | Number of through holes [number/cm²] | Number of through holes [number] | Battery lifetime [h] |
|---|---|---|---|---|
| Example 1 | 92.5 | 2.1 | 60 | 332 |
| Example 2 | 20.1 | 8.5 | 240 | 1723 |
| Example 3 | 1.5 | 17.1 | 480 | 2478 |
| Example 4 | 1.0 | 34.2 | 960 | 3341 |
| Comparative Example 1 | 2439.6 | 0 | 0 | 72-167 |
| Comparative Example 2 | 0.8 | 42.7 | 1200 | 0 |

Battery Lifetime Measurement 1

Metal-air batteries were manufactured by installing the air electrodes of Examples 1 through 4 and the air electrodes of Comparative Examples 1 and 2 as a positive electrode, installing zinc plates as a negative electrode, and filling battery cases with a 7M aqueous KOH solution as an electrolytic solution, respectively. Voltage measurement was performed at a constant current of 30 mA/cm² as a measurement condition, and the current application time, which elapsed before the measured voltage was lower than 0.8 V, was measured. The current application time as such was assumed to be the battery lifetime.

In Comparative Example 1, since the catalyst layer 13 had no through holes 133 as set forth in Table 1, the electrolytic solution 53 was collected between the catalyst layer 13 and the water repellent membrane 11 and the detachment of the water repellent membrane 11 occurred. In proportion to the change over time, the detachment of the water repellent membrane 11 developed over the entire face and the deterioration in voltage characteristics became obvious. In Example 1, 60 through holes 133 were provided in a region that was a fourth of the catalyst layer 13, so that the battery lifetime was prolonged as compared with Comparative Example 1 with no through holes. In the region, which was three fourths of the catalyst layer 13 and in which no through holes 133 were formed, however, the electrolytic solution 53 was collected between the catalyst layer 13 and the water repellent membrane 11 and the detachment of the water repellent membrane 11 occurred. As seen from the results in Examples 2 through 4, the battery lifetime was prolonged and the battery characteristics were improved as the number of the through holes in the catalyst layer was increased. The reason is presumably that the electrolytic solution 53, which had reached the water repellent membrane 11 side, was easier to return to the current collector 12 side and harder to collect between the catalyst layer 13 and the water repellent membrane 11 as the number of the through holes 133 was larger, which suppressed the development of the detachment of the water repellent membrane 11 as a cause for a reduced battery lifetime. In the metal-air battery, which included the air electrode of Comparative Example 2, the number of the through holes was large, so that the porosity was raised and the electrode reaction in the catalyst layer was inadequate, which resulted in a battery lifetime of 0 h.

Examples 5 Through 7

In Examples 5 through 7, the configuration of the water repellent membrane as a component of the air electrode was varied. The hole forming process and the pressing process were performed to give the catalyst layer through holes each having a constriction. The water repellent membrane to be pressure-bonded to the catalyst layer in the pressing process had an air permeance of 11 sec/100 cc in Example 5, an air permeance of 15 sec/100 cc in Example 6, and an air permeance of 2861 sec/100 cc in Example 7. Such air permeances of the water repellent membranes each fell within a preferable range of 10 to 10,000 sec/100 cc.

If the air permeance of the water repellent membrane 11 is less than 10 sec/100 cc, the electrolytic solution 53 begins to leak outside through the water repellent membrane 11 in the process of measuring the battery lifetime, so that the electrolytic solution 53 in the metal-air battery is reduced in proportion to the change over time, which causes the deterioration in battery characteristics. Leakage of a strongly alkaline solution is also undesirable in terms of the safety.

Comparative Example 3

As Comparative Example 3, an air electrode was produced with a configuration similar to the configurations in Examples 5 through 7 except that the water repellent membrane, which had an air permeance of 10,310 sec/100 cc, was used.

TABLE 2

|  | Air permeance [sec/100 cc, air] | Battery lifetime [h] | |
| --- | --- | --- | --- |
|  |  | Without through holes | With through holes |
| Example 5 | 11 | 74.59 | 403.5 |
| Example 6 | 15 | 52.58 | 421 |
| Example 7 | 2861 | 53.50 | 2225 |
| Comparative Example 3 | 10310 | 0 | 0 |

Battery Lifetime Measurement 2

Metal-air batteries were manufactured by installing the air electrodes of Examples 5 through 7 and the air electrode of Comparative Example 3 as a positive electrode, installing zinc plates as a negative electrode, and filling battery cases with the 7M aqueous KOH solution as an electrolytic solution, respectively. Voltage measurement was performed at a constant current of 30 mA/cm$^2$ as a measurement condition, and the current application time, which elapsed before the measured voltage was lower than 0.8 V, was measured. The current application time as such was assumed to be the battery lifetime. The voltage measurement was also performed on the individual air electrodes at a stage preceding the formation of through holes each having a constriction in the catalyst layer, so as to confirm the difference in battery lifetime due to the presence or absence of the through holes.

As set forth in Table 2, in each of Examples 5 through 7 with the air permeance of the water repellent membrane having fallen within the preferable range of 10 to 10,000 sec/100 cc, good results were gained about the battery lifetime when the through holes were present, as compared with the case where the through holes were absent. In other words, in each of the metal-air batteries, which included the air electrodes of Examples 5 through 7, respectively, the battery lifetime was prolonged and the battery performance was improved. In the metal-air battery, which included the air electrode of Comparative Example 3, the air permeance of the water repellent membrane did not fall within the preferable range, the voltage characteristics were not obtainable, and the battery lifetime was 0 h.

The present invention is suitably applicable to a metal-air battery used as one of power supply devices, and to an air electrode as a component of such a metal-air battery.

What is claimed is:

1. An air electrode comprising:
   a current collector;
   a water repellent membrane; and
   a catalyst layer arranged between the current collector and the water repellent membrane,
   wherein the catalyst layer includes a first face in contact with either one of the current collector and the water repellent membrane, a second face in contact with either other of the current collector or the water repellent membrane, and a plurality of through holes, through which the first face and the second face communicate with each other, and
   wherein the plurality of through holes each have a constriction with an inner diameter smaller than either of an opening diameter in the first face and an opening diameter in the second face.

2. The air electrode according to claim 1,
   wherein the plurality of through holes each have a cross section in a piercing direction that is a constricted shape having an inner diameter sequentially reduced from the first face toward inside of the catalyst layer and from the second face toward the inside of the catalyst layer.

3. The air electrode according to claim 1,
   wherein the opening diameter in the first face and the opening diameter in the second face of each of the plurality of through holes are each 1.1 to 4 times as large as the inner diameter of the constriction.

4. The air electrode according to claim 1,
   wherein the inner diameter of the constriction of each of the plurality of through holes is 100 to 400 μm.

5. The air electrode according to claim 1,
   wherein a number per unit area of the plurality of through holes in the first face or the second face of the catalyst layer is 2 to 40/cm$^2$.

6. The air electrode according to claim 1,
   wherein the plurality of through holes are provided in a lower portion of the catalyst layer more thickly than in an upper portion in a vertical direction orthogonal to the piercing direction of the plurality of through holes.

7. The air electrode according to claim 1,
   wherein a composite of the current collector and the catalyst layer has an air permeance of 1.0 sec/100 cc to 100 sec/100 cc.

8. The air electrode according to claim 1,
   wherein the water repellent membrane has an air permeance of 10 sec/100 cc to 10,000 sec/100 cc.

9. The air electrode according to claim 1,
   wherein the catalyst layer includes a plurality of types of carbon particles.

10. A metal-air battery comprising:
    the air electrode according to claim 1;
    a metal electrode; and
    an electrolyte.

11. A method of producing an air electrode including a current collector, a water repellent membrane, and a catalyst layer arranged between the current collector and the water repellent membrane, the catalyst layer including a plurality of through holes each piercing to a first face and a second face of the catalyst layer, the method comprising:

forming a plurality of first through holes in the catalyst layer before formation of the plurality of through holes, each first through hole piercing the catalyst layer in a thickness direction; and pressing the catalyst layer provided with the plurality of first through holes, wherein the pressing is performed in a piercing direction of the plurality of first through holes to form, in the catalyst layer, through holes each having a constriction with an inner diameter smaller than either of an opening diameter in the first face and an opening diameter in the second face.

\* \* \* \* \*